(12) United States Patent
Gupta et al.

(10) Patent No.: US 12,023,860 B2
(45) Date of Patent: *Jul. 2, 2024

(54) IN-SITU MONITORING SYSTEM ASSISTED MATERIAL AND PARAMETER DEVELOPMENT FOR ADDITIVE MANUFACTURING

(71) Applicant: General Electric Company, Schenectady, NY (US)

(72) Inventors: Vipul Kumar Gupta, Guilderland, NY (US); Natarajan Chennimalai Kumar, Schenectady, NY (US); Anthony Joseph Vinciquerra, Rexford, NY (US); Laura Cerully Dial, Clifton Park, NY (US); Voramon Supatarawanich Dheeradhada, Latham, NY (US); Timothy Hanlon, Glenmont, NY (US); Lembit Salasoo, Niskayuna, NY (US); Xiaohu Ping, Clifton Park, NY (US); Subhrajit Roychowdhury, Schenectady, NY (US); Justin John Gambone, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,391

(22) Filed: Oct. 17, 2022

(65) Prior Publication Data
US 2023/0029806 A1    Feb. 2, 2023

Related U.S. Application Data

(63) Continuation of application No. 16/360,180, filed on Mar. 21, 2019, now Pat. No. 11,472,115.

(51) Int. Cl.
*B29C 64/153*    (2017.01)
*B22F 10/20*    (2021.01)
(Continued)

(52) U.S. Cl.
CPC .......... *B29C 64/153* (2017.08); *B22F 10/20* (2021.01); *B22F 10/31* (2021.01); *B22F 10/85* (2021.01);
(Continued)

(58) Field of Classification Search
CPC ... B29C 64/153; B29C 64/393; B29C 64/386; B33Y 40/00; B33Y 10/00; B33Y 30/00;
(Continued)

(56) References Cited

U.S. PATENT DOCUMENTS

| 7,181,296 B2 | 2/2007 | Rotariu et al. |
| 7,586,061 B2 | 9/2009 | Hoebel et al. |

(Continued)

FOREIGN PATENT DOCUMENTS

| CN | 108290219 A | 7/2018 |
| CN | 108463838 | 8/2018 |

(Continued)

OTHER PUBLICATIONS

Tureyen, E.B. et al., "Development of an Iterative Learning Controller for Polymer based Micro-Stereolithography Prototyping Systems", 2016 American Control Conference (ACC), Boston, Jul. 6-8, 2016, (pp. 852-857, 6 total pages).

(Continued)

*Primary Examiner* — Zhipeng Wang
(74) *Attorney, Agent, or Firm* — Hanley, Flight & Zimmerman, LLC (57) ABSTRACT

According to some embodiments, system and methods are provided comprising receiving, via a communication interface of a parameter development module comprising a
(Continued)

processor, a defined geometry for one or more parts, wherein the parts are manufactured with an additive manufacturing machine, and wherein a stack is formed from one or more parts; fabricating the one or more parts with the additive manufacturing machine based on a first parameter set; collecting in-situ monitoring data from one or more in-situ monitoring systems of the additive manufacturing machine for one or more parts; determining whether each stack should receive an additional part based on an analysis of the collected in-situ monitoring data; and fabricating each additional part based on the determination the stack should receive the additional part. Numerous other aspects are provided.

19 Claims, 7 Drawing Sheets

(51) Int. Cl.
| | | |
|---|---|---|
| *B22F 10/31* | (2021.01) | |
| *B22F 10/85* | (2021.01) | |
| *B29C 64/393* | (2017.01) | |
| *B33Y 50/00* | (2015.01) | |
| *B22F 3/24* | (2006.01) | |
| *B22F 10/28* | (2021.01) | |
| *B22F 10/30* | (2021.01) | |
| *B22F 10/366* | (2021.01) | |
| *B22F 12/90* | (2021.01) | |
| *B33Y 10/00* | (2015.01) | |
| *B33Y 30/00* | (2015.01) | |
| *B33Y 40/00* | (2020.01) | |
| *B33Y 50/02* | (2015.01) | |

(52) U.S. Cl.
CPC .......... *B29C 64/393* (2017.08); *B33Y 50/00* (2014.12); *B22F 2003/245* (2013.01); *B22F 10/28* (2021.01); *B22F 10/30* (2021.01); *B22F 10/366* (2021.01); *B22F 12/90* (2021.01); *B33Y 10/00* (2014.12); *B33Y 30/00* (2014.12); *B33Y 40/00* (2014.12); *B33Y 50/02* (2014.12)

(58) Field of Classification Search
CPC ......... B33Y 50/00; B33Y 50/02; B22F 10/20; B22F 10/30; B22F 12/00; B22F 2003/245; B22F 3/1055; G05B 19/4099
See application file for complete search history.

(56) References Cited

U.S. PATENT DOCUMENTS

| | | | |
|---|---|---|---|
| 8,756,039 B2 | 6/2014 | Coughran et al. | |
| 9,855,698 B2 | 1/2018 | Perez et al. | |
| 9,999,924 B2 | 6/2018 | Dave et al. | |
| 11,472,115 B2 | 9/2022 | Gupta et al. | |
| 2009/0326706 A1 | 12/2009 | Fink et al. | |
| 2015/0331402 A1 | 11/2015 | Lin et al. | |
| 2015/0336331 A1 | 11/2015 | Potter | |
| 2016/0185048 A1 | 6/2016 | Dave et al. | |
| 2016/0236414 A1* | 8/2016 | Reese | B33Y 50/02 |
| 2017/0087451 A1 | 3/2017 | Champagne et al. | |
| 2017/0203512 A1 | 7/2017 | Gold | |
| 2018/0111192 A1* | 4/2018 | Ralls | B22F 10/20 |
| 2018/0178287 A1 | 6/2018 | Mamrak et al. | |
| 2018/0226844 A1 | 8/2018 | Lee et al. | |
| 2018/0322621 A1* | 11/2018 | Craeghs | G06T 7/001 |
| 2018/0339344 A1* | 11/2018 | Ralls | B22F 10/38 |
| 2018/0370144 A1 | 12/2018 | Revanur et al. | |
| 2019/0004079 A1 | 1/2019 | Blom et al. | |
| 2019/0022946 A1 | 1/2019 | Jones et al. | |
| 2019/0143413 A1 | 5/2019 | Dave et al. | |
| 2019/0283333 A1* | 9/2019 | Hwang | G06N 3/045 |
| 2019/0384274 A1* | 12/2019 | Bharadwaj | G05B 19/4099 |

FOREIGN PATENT DOCUMENTS

| | | |
|---|---|---|
| CN | 104200087 | 10/2018 |
| DE | 102018115324 A1 | 1/2019 |
| WO | 2014106753 A1 | 7/2014 |
| WO | 2016115284 A1 | 7/2016 |
| WO | 2017087451 | 5/2017 |
| WO | 2018226844 | 12/2018 |
| WO | 2019055576 A1 | 3/2019 |

OTHER PUBLICATIONS

International Searching Authority, "Search Report and Written Opinion," issued in connection with PCT patent application No. PCT/US2020/023776, dated Jun. 2, 2020, 15 pages.
United States Patent and Trademark Office, "Notice of Allowance," issued in connection with U.S. Appl. No. 16/360,180, dated May 31, 2022, 6 pages.
United States Patent and Trademark Office, "Non-Final Office action," issued in connection with U.S. Appl. No. 16/360,180, dated Feb. 17, 2022, 13 pages.
United States Patent and Trademark Office, "Final Office action," issued in connection with U.S. Appl. No. 16/360,180, dated Sep. 29, 2021, 13 pages.
United States Patent and Trademark Office, "Non-Final Office action," issued in connection with U.S. Appl. No. 16/360,180, dated Mar. 18, 2021, 11 pages.
Chinese Patent Office, "Office action," issued in connection with CN patent application No. 202080036465.6, dated Mar. 1, 2023, 10 pages.
Xu Lili, Research on Precision Control of Laser Deposition Manufacturing Based on Molten Pool Monitoring, May 15, 2018.
China National Intellectual Property Administration, "First Search," issued in connection with Chinese Patent Application No. 202080036465.6, dated Mar. 1, 2023, 2 pages.

* cited by examiner

IN-SITU MONITORING SYSTEM ASSISTED MATERIAL AND PARAMETER DEVELOPMENT FOR ADDITIVE MANUFACTURING

RELATED APPLICATION

This patent arises from a continuation of U.S. patent application Ser. No. 16/360,180, (now U.S. Pat. No. 11,472, 115) which was filed on Mar. 21, 2019. U.S. patent application Ser. No. 16/360,180 is hereby incorporated herein by reference in its entirety. Priority to U.S. patent application Ser. No. 16/360,180 is hereby claimed.

BACKGROUND

Additive manufacturing (AM) processes are used to fabricate precision three-dimensional objects from a digital model. Such objects are fabricated using an additive process performed by an additive manufacturing machine (AMM) under computer control to create an object using digital model data from a 3D model. Synonyms for additive manufacturing include additive fabrication, additive processes, additive techniques, additive layer manufacturing, layer manufacturing, freeform fabrication, 3D printing, rapid proto-typing, and direct digital manufacturing (DDM). An example of an AMM is a 3D printer, which can use a variety of technologies to melt, fuse, sinter, amalgamate, or otherwise physically or chemically modify a dispensed material to form a structure that has desired properties. The AM process may be used for a variety of materials, including but not limited to, polymers, metals, ceramics, etc. With respect to metals, some of the AM modalities include, but are not limited to, laser, e-beam, binder-jet, etc. In some instances, the AMM may form the object by solidifying successive layers of material one on top of the other on a build plate. Some AM systems use a laser (or other energy source) and a series of lenses and mirrors to direct the laser over a powdered material in a pattern provided by a digital model (e.g., powder-bed AM, an example of which is direct metal laser sintering (DMLS)). The laser consolidates the powdered material by sintering or melting the powdered material. The term "direct metal laser melting" (DMLM) may more accurately reflect the nature of this process since it typically achieves a fully developed, homogenous melt-pool and fully dense bulk structure upon solidification.

The DMLM process uses a 3D computer-aided design (CAD) model of the object to be manufactured, whereby a CAD model data file is created and sent to the fabrication facility. A technician may work with the 3D model to properly orient the geometry for part building and may add supporting structures to the design, as necessary. Once this "build file" has been completed, it is "sliced" into layers of the proper thickness for the particular DMLM fabrication machine and downloaded to the machine to allow the build to begin. The metal powder on the build plate is fused into a solid part by melting it locally using the focused laser beam. In this manner, parts are built up additively, layer by layer. This process allows for highly complex geometries to be created directly from the 3D CAD data, automatically and without any tooling. DMLM produces parts with high accuracy and detail resolution, good surface quality, and excellent mechanical properties.

In conventional additive manufacturing practice, a part build plan (PBP) is generated for a particular part design and is executed by the AMM. Based on the PBP, the AMM controls multiple build parameters (e.g., combinations of machine and laser parameters in the DMLM process) that are applied during the build, including the travel path of the material addition zone and parameters governing the application and processing (e.g., melting) of the material. In general, there is a complex relationship between these parameters and the quality and performance of the built part.

The traditional build parameter optimization is an iterative process, which includes building a part based on a trial parameter set, followed by an ex-situ assessment of the resulting trial part quality, and then modification of the trial parameter set to adjust the expected part quality, build the next part with the adjusted parameter set, assess the new part quality, etc. This iteration of trial parameter sets to meet overall manufacturing requirements, such as part quality and production rate, may require multiple iterations to attain the desired manufacturing requirements. This process is very time consuming, expensive and requires considerable quantities of material, equipment time, and labor resources. Even after multiple build iterations, additional time and resources may still be required for printing, analyzing and testing, if the build parameter sets are not yet optimized to meet the design requirements of the part.

Therefore, it would be desirable to provide a system and method that optimizes the parameter development for building the part.

BRIEF DESCRIPTION

According to some embodiments, a method includes receiving, via a communication interface of a parameter development module comprising a processor, a defined geometry for one or more parts, wherein the parts are manufactured with an additive manufacturing machine, and wherein a stack is formed from one or more parts; fabricating the one or more parts with the additive manufacturing machine based on a first parameter set; collecting in-situ monitoring data from one or more in-situ monitoring systems of the additive manufacturing machine for one or more parts; determining whether each stack should receive an additional part based on an analysis of the collected in-situ monitoring data; and fabricating each additional part based on the determination the stack should receive the additional part.

According to some embodiments, a system includes a parameter development module; a parameter development processor; and a memory storing program instructions, the parameter development processor and the parameter development module operative with the program instructions to perform the functions as follows: receive, via a communication interface of the parameter development module, a defined geometry for one or more parts, wherein the parts are manufactured with an additive manufacturing machine, and wherein a stack is formed from one or more parts; fabricate the one or more parts with the additive manufacturing machine based on a first parameter set; collect in-situ monitoring data from one or more in-situ monitoring systems of the additive manufacturing machine for one or more parts; determine whether each stack should receive an additional part based on an analysis of the collected in-situ monitoring data; and fabricate each additional part based on the determination the stack should receive the additional part.

According to some embodiments, a non-transitory computer readable medium stores instructions that, when executed by a computer processor, cause the computer processor to perform a method including: receiving, via a communication interface of a parameter development module comprising a processor, a defined geometry for one or more parts, wherein the parts are manufactured with an additive manufacturing machine, and wherein a stack is formed from one or more parts; fabricating the one or more parts with the additive manufacturing machine based on a first parameter set; collecting in-situ monitoring data from one or more in-situ monitoring systems of the additive manufacturing machine for one or more parts; determining whether each stack should receive an additional part based on an analysis of the collected in-situ monitoring data; and fabricating each additional part based on the determination the stack should receive the additional part.

A technical effect of some embodiments of the invention is an improved technique and system for fabricating parts via AM processing. Embodiments provide for optimizing a parameter development process and machine parameters for building the part, with not only a high-quality but also with optimal production rate (e.g., quality, performance, cost and speed). Embodiments provide for optimization for alone or more metrics. Some embodiments provide for the rapid optimization of build parameters to fabricate parts in a reproducible and robust manner, using in-situ monitoring systems and predictive material modeling (e.g., either physics-based/informed or machine learning, or a combination of both (i.e., a hybrid model). Embodiments may reduce cycle time for build parameter development from months to weeks, or even days (or less). The reduced time may enable rapid qualification and insertion of new additive materials for a variety of applications. The reduced build parameter development cycle may allow more efficient use of resources (personnel, materials, additive machines, characterization and physical and mechanical testing equipment, etc.), and may generate build parameter sets for optimal part performance. One or more embodiments may provide predictive material models so that part properties can be predicted without the need for additional experiments for any given process parameters, geometric feature type etc. One or more embodiments may generate parts designed to test multiple parameter sets within the same build to develop and optimize parameters in parallel, unlike conventional methods that work in series. It is noted that the in-situ monitoring tools and predictive material modeling assisted parameter development described by one or more embodiments may apply to parts/coupons printed on a build-plate in series fashion. However, stacking them may decrease the overall machine/post-processing/analysis time, and thus, reduce the parameter development cycle. In the case of printing parts in stack, parameters for different geometries or features may be optimized in parallel based on an in-situ response plus the predictive material model. However, the in-situ response plus the predictive material model informed next set of build parameters may be used to print parts on a separate build plate, and not necessarily stacking the multiple parts on the same build plate.

It is also noted that conventional process parameter development in AM begins with development of parameters for bulk sections. Once an operating window (e.g., for bulk defects/anomalies, such as pores, cracks and lack-of-fusion defects) for bulk parts is identified, process parameters are further refined for thin-sections such as walls, skin for porosity/cracks; for surface finish for contours, down-side and upside surfaces, and so-on. Often, a majority of these features may be printed build-by-build during the parameter development process, and if something is wrong on one of the features, the process may be repeated from the beginning. In this way, conventional processes may waste a lot of time, materials and equipment resources. To resolve these problems, one or more embodiments provide for many of these features on as single build plate, and develop parameters in parallel/simultaneously. While one or more embodiments may still include an iterative process to optimize the parameters for different feature types, one or more embodiments require order of magnitude less samples and builds than traditional approaches. The innovative part design and builds with stacked parts provided by one or more embodiments, allow for assessment of different features in parallel, with smaller numbers of coupons, which then provides for a faster parameter development/optimization.

Embodiments may provide for an in-situ monitoring system-assisted design parameter sets, or sensors-informed build parameter sets to minimize or fully eliminate the need of physical or mechanical testing or any other measurements of coupons (e.g., test samples of parts), which may expedite the parameter development process. It is noted that sensors may be a non-exhaustive example of an in-situ monitoring system, and that the terms "design of experiment (DOE)" and "parameter set," may be used interchangeably herein. The in-situ monitoring data collected from previous builds, stacks, parts or layers may be used to inform the build parameter sets for subsequent builds, stacks, parts or layers. For example, build parameters informed by an in-situ monitoring system may be changed for progressive layers on some or all parts, without interrupting the build and without the need for physical testing (i.e., without extracting parts from the build for ex-situ non-destructive evaluation or cut-ups and characterization) or mechanical testing, or any other measurements. An outcome of one or more embodiments is a set of build parameters to build a part with desired performance. Additionally, an outcome may also comprise a build parameter response surface (build parameters vs. material properties) that may be used to generate build parameters for other applications with different objectives (e.g., trade-off between productivity and quality, or one property, e.g., creep vs. another property, e.g. low cycle fatigue). It is noted that with regard to response surfaces, there may be multiple input variables and measured or predicted output variables. These input and output variables may be presented as multi-dimensional plots of material anomalies, surface finish, physical or mechanical properties or microstructures as a function of laser parameters (e.g., power, speed, spot-size and hatch-spacing, for each geometric feature (e.g., bulk, thin-wall/skin, thru-holes, down-side/upside surfaces). It is further noted that the formation of anomalies, surface finish microstructure, and materials properties may be significantly different in different feature types (i.e., geometries) due to differences in melt-pool temperatures (and associated melt-pool width, depth) they have experienced during the process. Similarly, predictive material models may be generated for each of the output variables.

One or more embodiments may provide a library of one or more data sets of build parameters and resulting properties, and thus, provide flexibility to the user for multi-objective optimization e.g., high-quality vs. high productivity build parameter sets. In one or more embodiments, predictive and control-based models may be used for pre-screening and sorting printed coupons for post-processing and property measurements, as well as to guide the next iteration for optimization of build parameters.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

Conventionally, the process to develop an optimal parameter set to build a part may take several weeks to months. The current process may include developing a build parameter set for a single part, or one geometric feature of a part, and then developing a build parameter set for a next geometric feature of a part, in series. In many cases, the process developed for the first feature may help provide a starting point (initial build parameter operating window) for the next feature. Typically, this parameter development is via trial-and-error and may take multiple builds of the part before an optimal build parameter set is realized. It is noted that parameter development is typically executed via coupons, which are representative of part geometry, as described further below. Additionally, with typical build parameter development, the part is at least mostly built before it is analyzed to determine whether it is acceptable as characterized by either non-destructive evaluation or destructive physical or mechanical testing. As such, a problem with an early build step may not be detected until the entire part is built.

In one non-exhaustive example, a test coupon ("coupon") is a representative test sample of the part being manufactured by AM. Coupons may be simple shapes suitable for analysis that may contain one or more features and may be representative of the parts being built. For example, the features may include, but are not limited to, bulk, contour, thin-walls, downside (over-hangs of different angles), through-holes (for dimensional tolerances), and upside (top surface of the part, dome, etc.). In one or more embodiments, in-situ monitoring systems within the AM device may collect data during the manufacture of the coupon. As described above, in AM, the coupon (or part) may be formed from multiple layers, and one or more parts may form a stack. In one or more embodiments, the in-situ monitoring system may provide data for a part, a stack or a layer. The data may then be analyzed to determine the next set of build parameters, as informed by the response of the in-situ monitoring system and/or by predictive material models. This allows assessment of a larger set of parameters with a smaller number of coupons and minimal physical or mechanical testing, or other measurements.

Figure 1:
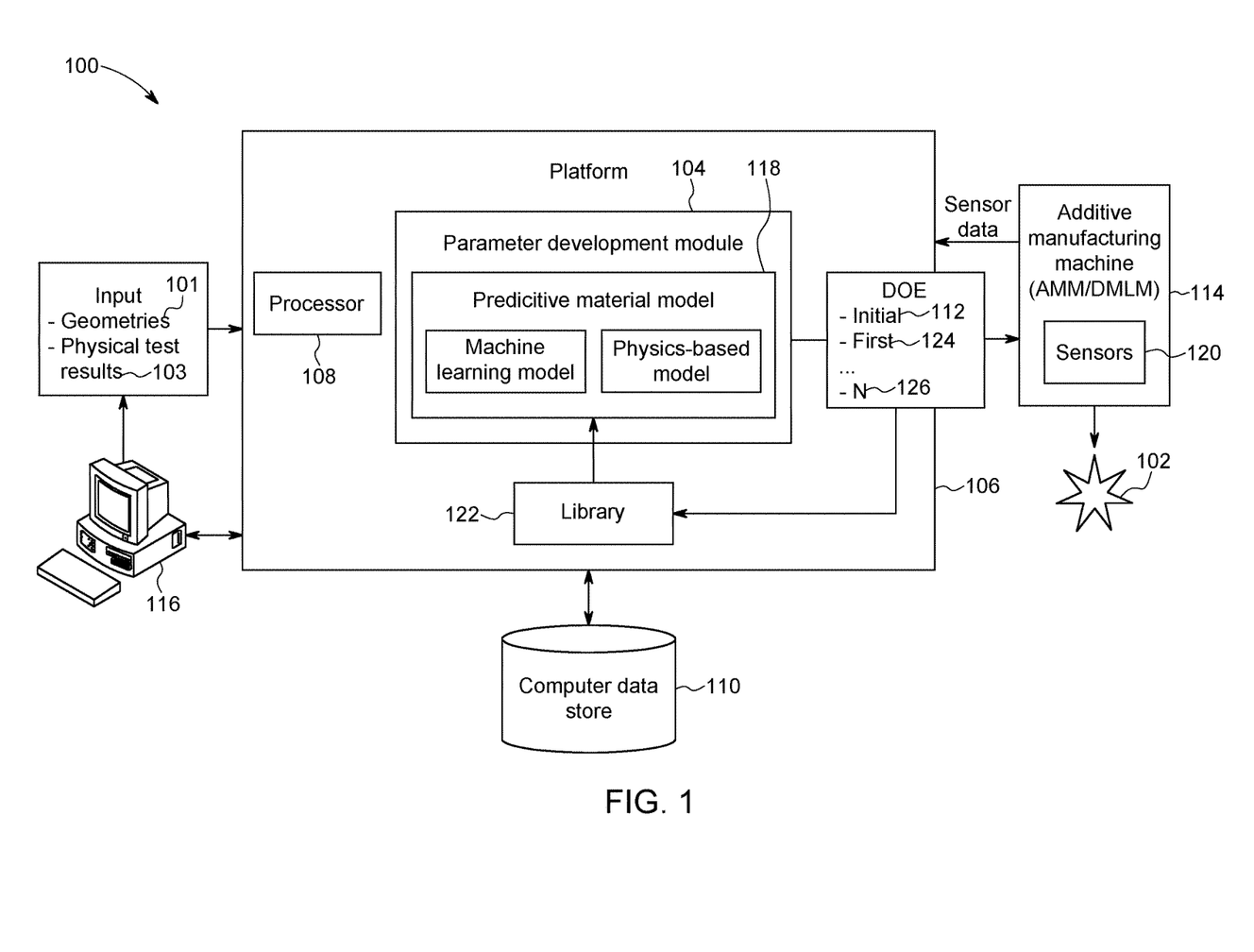
FIG. 1 illustrates a system according to some embodiments.
Figure 2:
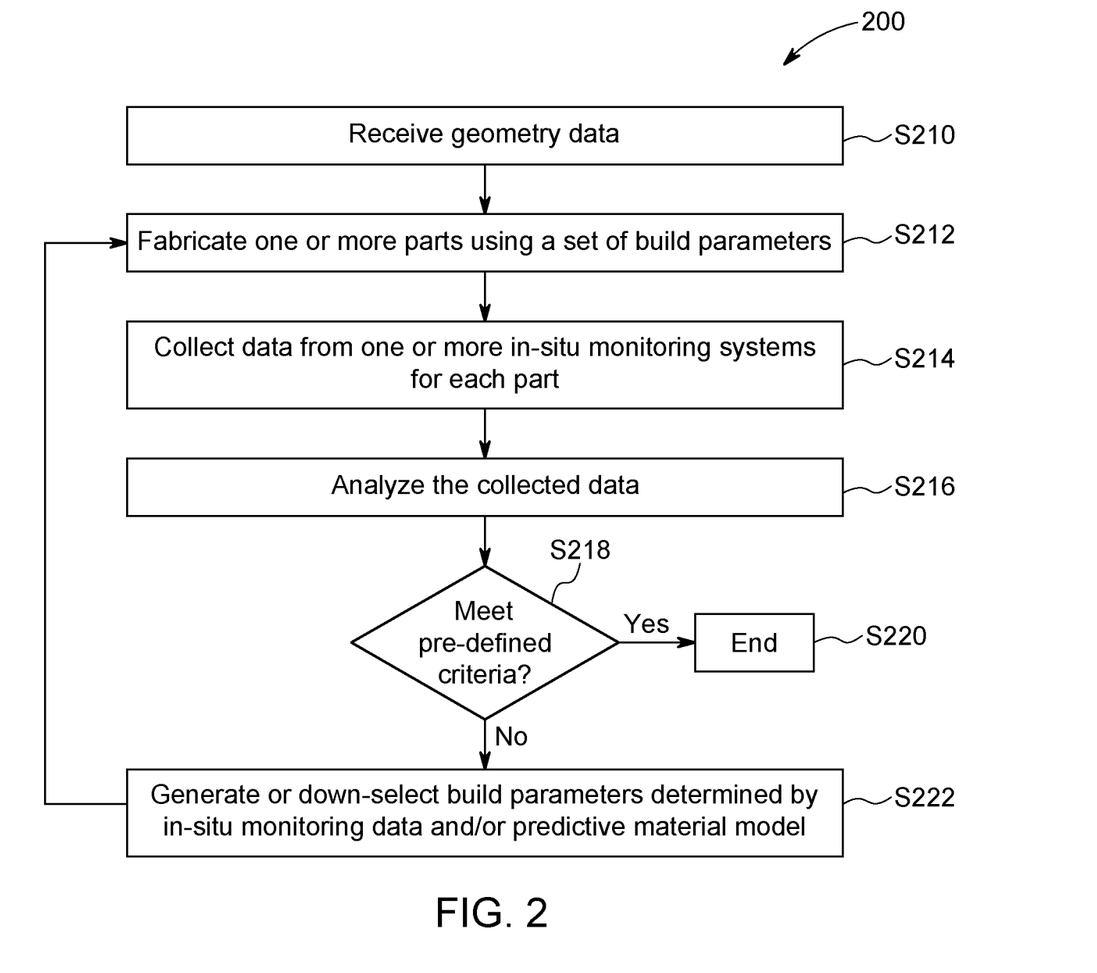
FIG. 2 illustrates a flow diagram according to some embodiments.

Turning to FIGS. 1-6, a system 100 and diagrams of examples of operation according to some embodiments are provided. In particular, FIG. 2 provides a flow diagram of a process 200, according to some embodiments. Process 200 and other processes described herein may be performed using any suitable combination of hardware (e.g., circuit(s)), software or manual means. In one or more embodiments, the system 100 is conditioned to perform the process 200 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

Initially at S210, a user specified geometry 101 for one or more parts 102 is received at a build parameter development module 104 on a platform 106 of a system 100. In one or more embodiments, each part 102 manufactured by an AM process may include one or more geometric features 101. The user-specified geometry may be received via CAD file, or other suitable file.

In one or more embodiments, the system 100 may include one or more processing elements 108 and a memory/computer data store 110. The processor 108 may, for example, be a microprocessor, and may operate to control the overall functioning of the build parameter development module 104. In one or more embodiments, the build parameter development module 104 may include a communication controller for allowing the processor 108, and hence the build parameter development module 104, to engage in communication over data networks with other devices (e.g., the additive manufacturing device 114 and user interface 116).

In one or more embodiments, the system 100 may include one or more memory and/or data storage devices 110 that store data that may be used by the module. The data stored in the data store 110 may be received from disparate hardware and software systems associated with AMM, or otherwise, some of which are not inter-operational with one another. The systems may comprise a back-end data environment employed by a business, industrial or personal context.

In one or more embodiments, the data store 110 may comprise any combination of one or more of a hard disk drive, RAM (random access memory), ROM (read only memory), flash memory, etc. The memory/data storage devices 110 may store software that programs the processor 108 and the parameter development module 104 to perform functionality as described herein.

As used herein, devices, including those associated with the system 100 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Figure 3A:
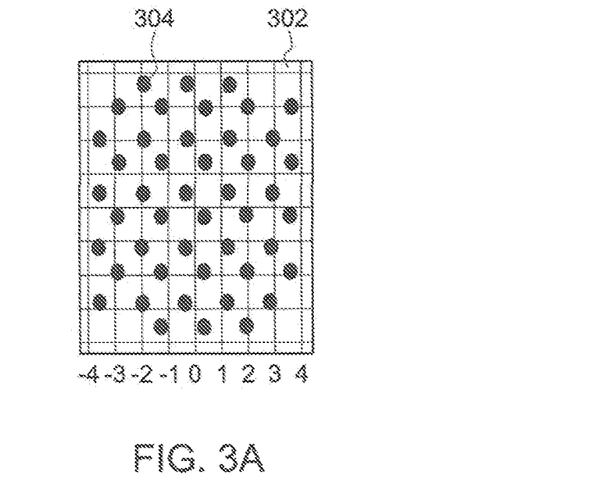
FIGS. 3A-C illustrates non-exhaustive examples of multi-feature coupon/part designs according to some embodiments.
Figure 3B:
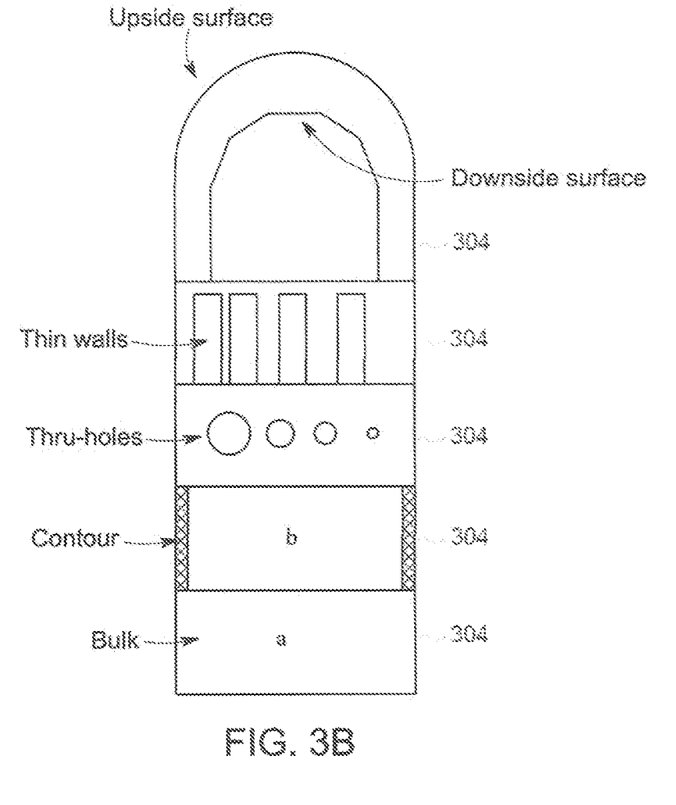
Figure 3C:
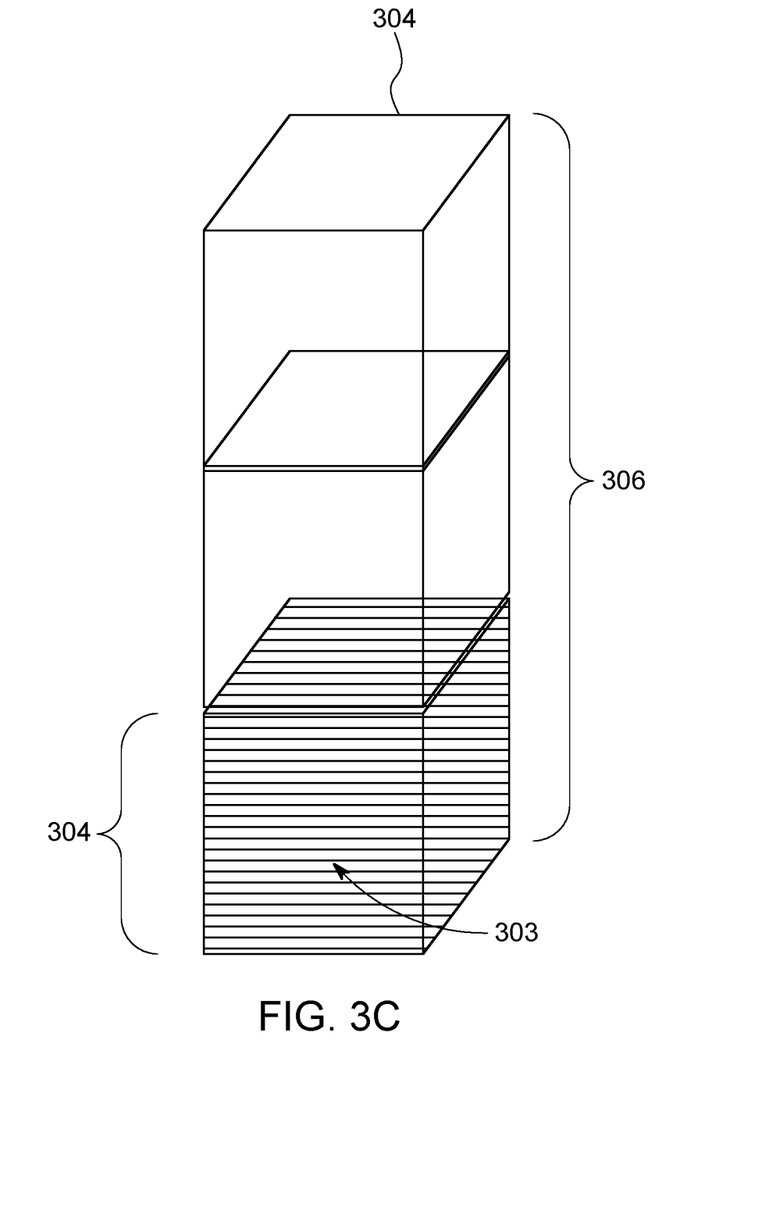

Turning back to the process 200, in S212 one or more parts 304 are fabricated with the additive manufacturing machine based on a set of build parameters (e.g., a first parameter set). In one or more embodiments, parameter sets may be obtained by any suitable means (e.g., generated, received from a device, etc.). As described above, the coupon (or part) may be formed from multiple layers 303, and one or more parts 304 may form a stack 306, as shown in FIGS. 3B-3C. As shown in FIG. 3A, a build plate 302 may have built thereon, via the AM process, one or more parts or coupons 304. Each of the circles on the build plate 302 may represent a part or coupon. In one or more embodiments, a "build" may be parallel such that multiple parts with multiple features are fabricated on a single build plate. This is as compared to conventional serial parameter optimization approaches where first one or two different features (generalized for bulk) are fabricated for all of the parts on the plate, and then similar or more complex features (generalized for contours) are fabricated for all of the parts on the plate, etc. It is noted that the conventional serial process is often used because it may be necessary to down-select an operating window (which is usually larger for) bulk sections, followed by further refinement for other complex features. It may be a linear process where knowledge/data/parameter sets/measurements from previous steps inform the next step as the complexity of the features increase. One or more embodiments provide for the elimination of a majority of conventionally used linear steps, by parallelizing the parameter development of multiple features in stacked form printed on the same build plate. Instead of printing coupons of different features and complexities on sequential builds, then extracting, analyzing, and using measured data to inform next builds, as with conventional processes, one or more embodiments provide methods that include in-situ monitoring systems, predictive material models, innovative coupon designs, controls, and analytics to inform next builds. The in-situ monitoring systems and predictive material models provide information about the layer, part or stack without cutting the part (or at least minimizing the post-processing), to generate a next set of experiments (build parameters) for optimizing the process parameters of the features.

As shown in FIGS. 3B and 3C, each stack 306 may include one or more parts (coupons) 304, where each part may include one or more layers 303. In one or more embodiments, each part 304 may include one feature or more than one feature. One part ("a") 304 in FIG. 3B, may represent the bulk or core features. Another part ("b") 304 in FIG. 3B, may represent contour features. Other parts 304 in FIG. 3B, may represent through horizontal holes (e.g., 0.5, 1, 2, 3 mm), etc.), wall features (e.g., varied wall thicknesses (e.g., 0.5, 1, 2, 3 mm), downside surface angles (e.g., 0°, 30°, 60°)/upside surfaces/angles, respectively. It is noted that while only five parts in a stack are shown herein, any number of parts may be used to form a coupon/stack.

Figure 5A:
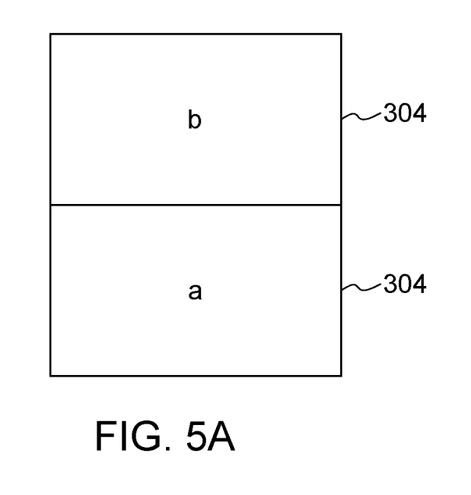
FIGS. 5A-B illustrates a plurality of parts and analysis according to some embodiments.
Figure 5B:
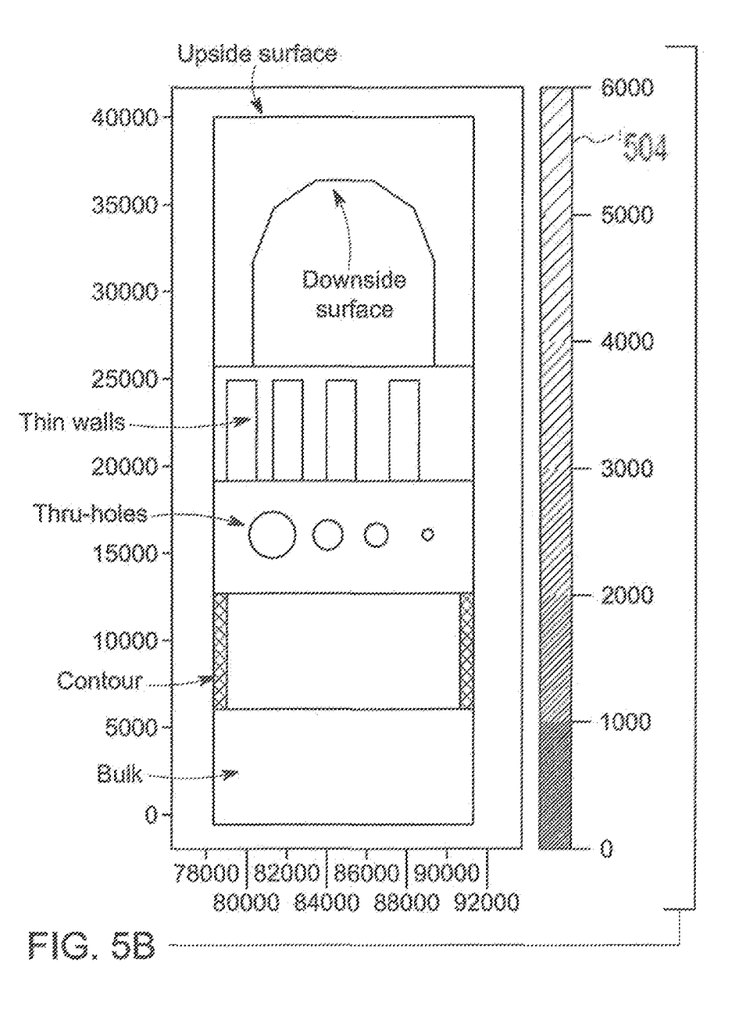

Continuing with the stacks/parts shown in FIG. 3B, "a" and "b" may be fabricated in S212 as shown in FIG. 5A. In-situ monitoring tool data 504 is then collected from the one or more monitoring system 120 of the AMM 114 for each of the parts in S214, as shown in FIG. 5B. In one or more embodiments, the collected in-situ monitoring data may be for at least one of the one or more layers 303 or the one or more parts 304. The in-situ monitoring data 504 may be represented, for example, as a thermal map, intensity map or any other suitable data. In one or more embodiments, the collected in-situ monitoring data includes at least one of laser-material and laser-environment interactions and a melt-pool response.

It is further noted that FIGS. 3A-3C and 5A-5C illustrate non-exhaustive examples of multi-feature coupon designs for process parameter development/optimization for complex-part geometries. Other designs may be used that include one or more features/geometries, for example, but not limited to, bulk section, think-walls and through-holes (horizontal and vertical), round surfaces, inclined surfaces (downside/overhangs), upside surfaces. One or more embodiments apply to coupons/parts with one or more features.

As used herein, the (build) parameter set may refer to one or more machine and laser parameters used to operate the laser in an AMM. For example, the laser parameters may include, but are not limited to, laser speed, laser power, laser beam diameter, and hatch-spacing. Prior to obtaining the first parameter set 124, an initial set of build parameters 112 is generated.

Figure 4:
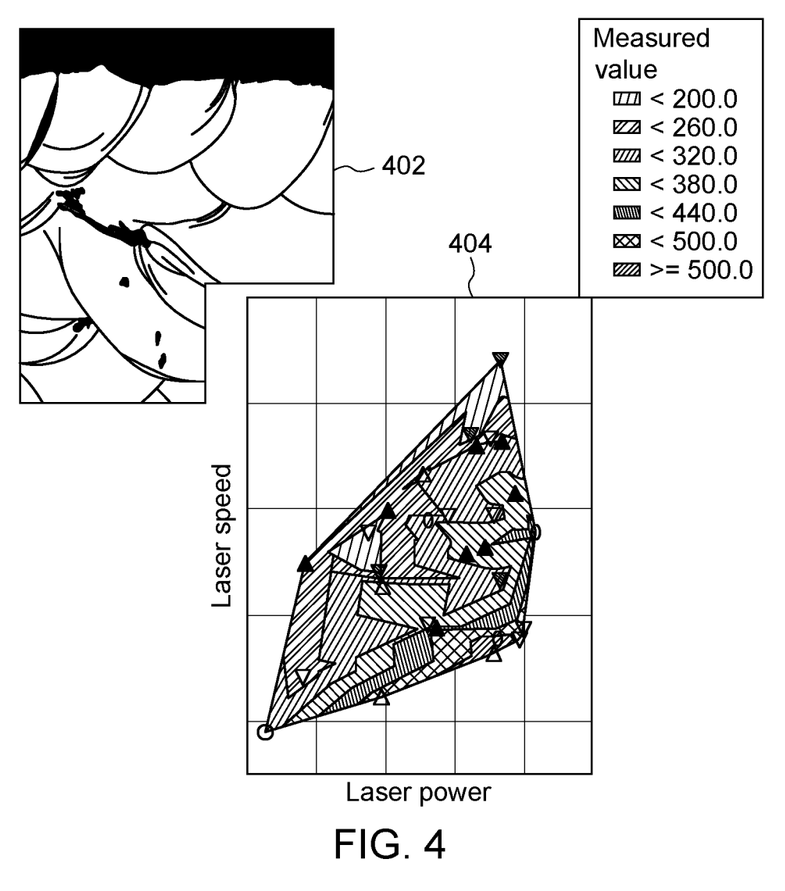
FIG. 4 illustrates a melt-pool track and image according to some embodiments.

In one or more embodiments, the initial set of build parameters 112 may be based on parameters within the machine's operating range of power and speed combinations for a laser specified by the user for a specific AM machine and powder material. One or more power and speed combinations within the machine's operating range are used as the initial set of build parameters 112, in combination with the received user-specified geometry 101, in the execution of preliminary physical or virtual experiments or model predictions (e.g., a bead-on-powder or bead-on-plate process) to generate one or more line-scans 402 (FIG. 4). As used herein, a "line-scan" refers to single melt-pool tracks. It is noted that laser tracks (single or overlapped) may be line-scans generated by laser, which eventually melt the material (e.g., powder-bed or solid-plate) and create a melt-pool. The melt pool may be characterized for melt-pool width, depth and shape to generate a response surface. The response surface may guide a next set of experiments, as well as provide data from calibration and validation of physics-based or machine learning models. These models may be used in following steps for assisting the parameter development process (e.g., guide design of experiments or property predictions). The line-scan 402 is then analyzed offline by means of non-destructive or destructive testing or measurements or cross-sectional optical imaging. In one embodiment the melt-pool tracks may be sectioned and analyzed for melt-pool shapes. In one or more embodiments, an in-situ analysis of the one or more melt-pool tracks may be executed with one or more in-situ monitoring systems of the additive manufacturing machine. At least one predictive material model 118 may be generated based on the analysis of the collected in-situ monitoring data form the one or more melt-pool tracks and one or more tests or measurements performed on the one or more melt-pool tracks. In one or more embodiments, a response surface 404 data may be generated via an in-situ monitoring data analysis from one or more in-situ monitoring systems 120 within the AMM, or via means of predictive material models or via non-destructive or destructive physical testing or cross-sectional optical imaging (offline) of melt-pool tracks, for the measurements of melt-pool width, depth and shape. The parameter development module 104 may map the testing results or measurements 103 (e.g., melt-pool, microstructure, etc.) to the response surface 404, and compare the results. When the test results and the optical imaging results meet a pre-set level, this initial build parameter set 112 may be used to generate at least one predictive material model 118. Examples of predictive material models 118 include, but are not limited to, machine learning models (e.g., meta-models Bayesian Hybrid Model (BHM), Artificial Neural Networks (ANN), Deep Learning methods) and physics-based models. In one or more embodiments, the threshold on which the system is optimized may be a value for an acceptable defect fraction.

In one or more embodiments, the initial build parameter set 112, test results 103 and in-situ monitoring data (i.e., response surface) 404 may also be stored in a library 122 that may be used to provide the predictive material model with a baseline in-situ monitoring system response for future build parameters.

The generated predictive material model 118, which takes the in-situ monitoring data into account, may then be used in some embodiments to generate the first set of build parameters 124, or a design of experiment (DOE). In one or more embodiments, fabrication of the one or more parts may be based on the first set of build parameters. In one or more embodiments, in addition to the predictive material model, model-based control and materials physics may be used to generate the first set of build parameters 124. More specifically, the predictive material model may be used to identify areas of the build parameter space where the model is not accurate or certain enough about the prediction, and that information may be used to generate new experiments to be performed in that build parameter space for the first set of build parameters 124. In general, multiple objectives may be used to drive generation of the first and the subsequent sets of build parameters. Some examples include, but are not limited to, minimizing the predictive material model uncertainty in the overall build parameter space, or minimizing (optimizing) anomalies or defect fraction in the coupons/parts.

Turning back to the process 200, next, in S216, the build parameter development module 104, analyzes the information collected from the monitoring system data. Then in S218, it is determined whether predefined criteria are met. With respect to the pre-defined criteria, the one or more stacks may receive an additional part when the analysis of the collected in-situ monitoring data indicates the data falls one of inside or outside a pre-determined value or range of values. As a non-exhaustive example, each stack may receive an additional part if the data falls outside of a predetermined range, and will not receive an additional part if the data falls within a predetermined range (or vice versa). In one or more embodiments, it is determined whether each stack should receive an additional part based on at least one of an analysis of the collected in-situ monitoring data and a predictive material model informed build parameter set. When in S218, the predefined criteria are met, the process 200 ends in S220. In one or more embodiments, the build parameter development module 104 may determine whether the first set of parameters 124 used to fabricate the one or more parts in S212 should be modified based on a response provided by data from the in-situ monitoring system. When in S218 predefined criteria are not met, build parameters are generated or down selected in S222 by in-situ monitoring data and/or predictive material models. For example, as used herein, "down-selected" may refer to the selection of a build parameter set based on a uniform property-optimized response obtained from a coupon provided by the in-situ monitoring data 504. In one or more embodiments, the down-selection may be based on an analysis of one or more parts fabricated in S212. In one or more embodiments, the down-selection may be based on a comparison of the collected in-situ monitoring data to predicted values received from machine learning or other predictive material models.

After S222, the process returns to S212, and one or more additional parts are fabricated. It is noted that in one or more embodiments, the analysis in S216 may interrupt the build process, but this interruption may be minimal. It is also noted that the parameters that are not down-selected may at least one of be discarded or used to enhance the models. Additionally, the optimal (e.g., down-selected) parameters in the parameter sets may be added to the library 122 for future implementation and investigations.

It is further noted that in-situ monitoring system data analysis from previous builds/coupons may be used to determine the operating window and down-selected parameters that may be used as a starting point for optimization of different feature types. While the examples herein describe the optimization process as taking place on progressive parts in stacks on the same build, this is a non-exhaustive example, and the optimization process may take place by printing multiple parts on separate build plates instead of stacked form on the same build plate.

Figure 6:
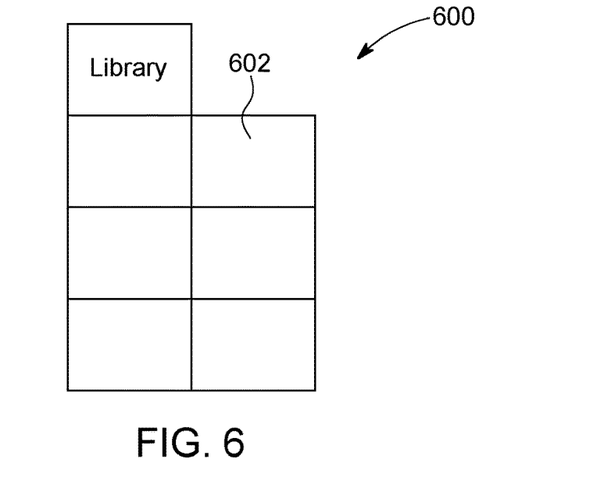
FIG. 6 illustrates a library according to some embodiments.

A non-exhaustive example of a library 122/600 including one or more entries 602 is shown in FIG. 6. The library 122 of response surfaces is generated by mapping the executed analysis of the in-situ monitoring data to one or more test measurements and/or results. The entries 602 may include in-situ monitoring system response vs. test measurements (e.g., photo-diode intensity vs. porosity); laser parameters vs. test measurements (e.g., power, speed vs. porosity); or laser parameters vs. in-situ monitoring system response (e.g., power, speed vs. photo-diode intensity). Other suitable entries may be used.

Continuing with the example part 304 shown in FIG. 5A, it is desirable to have confirmation that "part a" and "part b" are acceptable parts before any of parts "c-e" shown in FIG. 5C are fabricated. The confirmation of acceptability may avoid forming additional parts on unacceptable parts. The unacceptable parts may void the entire stack. As a non-exhaustive example, the build plate 302 includes 50 parts, and if two parts are fabricated from the first set of build parameters, 100 build parameter sets (DOEs) may be analyzed via analysis of the parts. Based on that analysis in S218, only 4 build parameter sets may be down-selected to have "part c" and "part d" fabricated.

In one or more embodiments, the next set of build parameters 126 may be informed by the first set of build parameters (or any immediately preceding build parameter sets or processing window) in combination with any predictive material models. In one or more embodiments, this may be an iterative process using in-situ monitoring data, where variable corrections or adjustments are applied to the parameters of a first set for predictable disturbances (e.g., to correct laser power level as a function of laser position) in the generation of the next set of build parameters. The corrections may be based on data from sensors (or other in-situ monitoring systems). The iterative process may determine a correlation between sensor data and part quality. The correlation may be used in the generation of an optimal parameter scan set, which may be used in turn to fabricate the parts. It is noted that the iterative process may include optimization of build parameters for one or more geometric feature types (e.g., bulk only, bulk and contour, or bulk, contour, thin-walls, etc.). The next part may be made of the same feature type or a different feature type.

In one or more embodiments, the library 122 and any set of build parameters may be output to a user platform 116 (a control system, a desktop computer, a laptop computer, a personal digital assistant, a tablet, a smartphone, etc.) to view information about and/or manage the operation of the AM device in accordance with any of the embodiments described herein. In one or more embodiments, the library entries (e.g., set of build parameters) may be used to control the AMM to fabricate the parts. In one or more embodiments, the library (including the entries) output from the build parameter development module 104 may be transmitted to various user platforms or to other systems (not shown), as appropriate (e.g., for display to, and manipulation by, a user). It is noted that in one or more embodiments at least three types of libraries may be created via in-situ monitoring assisted parameter optimization: 1. Mapping between analyzed data collected through in-situ monitoring system and testing of the part (e.g., photo-diode intensity vs. measured porosity); 2. Mapping between laser parameters and in-situ monitoring system response (e.g., laser power and/or speed vs. photo-diode intensity); and 3. Mapping between laser parameters and testing results (e.g., laser power and/or speed vs. measured porosity). In addition, libraries could be generated by using predicted properties instead of measured test results.

Figure 7:
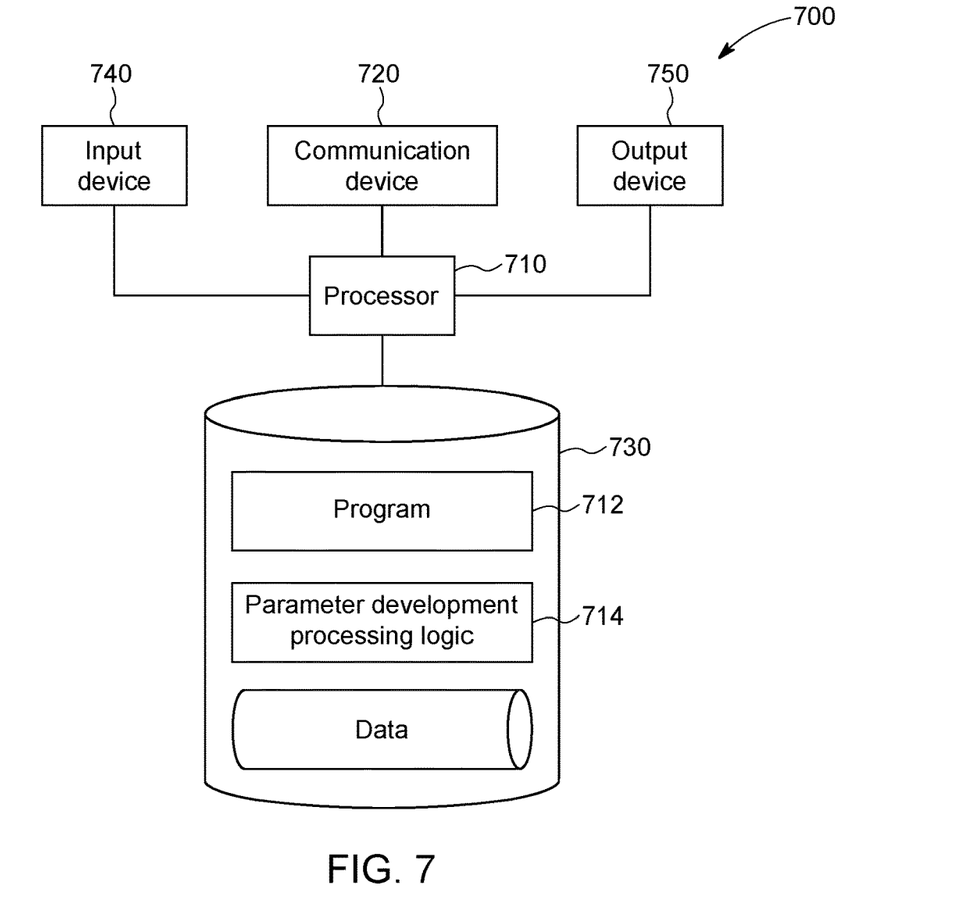
FIG. 7 illustrates a block diagram of a system according to some embodiments.

Note the embodiments described herein may be implemented using any number of different hardware configurations. For example, FIG. 7 illustrates a build parameter development processing platform 700 that may be, for example, associated with the system 100 of FIG. 1. The build parameter development processing platform 700 comprises a build parameter development processor 710 ("processor"), such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more users. The build parameter development processing platform 700 further includes an input device 740 (e.g., a mouse and/or keyboard to enter information about the part) and an output device 750 (e.g., to output and display the data and/or recommendations).

The processor 710 also communicates with a memory/storage device 730. The storage device 730 may comprise any appropriate information storage device, including combinations of magnetic storage devices (e.g., a hard disk drive), optical storage devices, mobile telephones, and/or semiconductor memory devices. The storage device 730 may store a program 712 and/or parameter development processing logic 714 for controlling the processor 710. The processor 710 performs instructions of the programs 712, 714, and thereby operates in accordance with any of the embodiments described herein. For example, the processor 710 may receive input and then may apply the parameter development module 104 via the instructions of the programs 712, 714 to generate a set of build parameters for fabrication of a part.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a parameter development module. The method steps can then be carried out using the distinct software modules and/or sub-modules of the system, as described above, executing on one or more hardware processors 710 (FIG. 7). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
receiving, via a communication interface, a first defined geometry for a first part and a second defined geometry for a second part, wherein the first and second parts are manufactured in a stack with an additive manufacturing machine,
generating, using a processor, a first parameter set to fabricate the stack of first and second parts with the additive manufacturing machine based on a first parameter set, the first parameter set determined using the first and second defined geometries and an operating range of the additive manufacturing machine;
collecting first in-situ monitoring data from one or more in-situ monitoring systems of the additive manufacturing machine for the first and second parts;
calibrating at least one predictive material model using the collected in-situ monitoring data;
determining whether the stack should receive an additional part based on an output of the at least one predictive material model using second collected in-situ monitoring data; and
generating, using the processor when the determination is for the stack to receive the additional part, a second parameter set to fabricate the stack with the additional part.

2. The method of claim 1, wherein each part includes one or more layers.

3. The method of claim 1, wherein the collected in-situ monitoring data includes at least one of laser-material and laser-environment interactions.

4. The method of claim 1, wherein the collected in-situ monitoring data includes a melt-pool response.

5. The method of claim 1, wherein it is determined whether the stack should receive the additional part when the collected in-situ monitoring data falls one of inside or outside of a predetermined value or range of values.

6. The method of claim 1, wherein the first parameter set is based on the at least one predictive material model.

7. The method of claim 6, wherein fabrication of the predictive material model further comprises:
executing at least one of a bead-on-powder and bead-on-plate process with an initial parameter set to output one or more melt-pool tracks;
collecting in-situ monitoring data from the one or more melt-pool tracks;
executing an in-situ analysis of the one or more melt-pool tracks with one or more in-situ monitoring systems of the additive manufacturing machine based on the collected in-situ monitoring data; and
generating at least one predictive material model based on at least one of the in-situ monitoring data analysis and one or more tests or measurements performed on the one or more melt-pool tracks.

8. The method of claim 1, further comprising:
generating a library of response surfaces by mapping analysis of the in-situ monitoring data to one or more tests, measurements or results.

9. The method of claim 1, wherein the predictive material model is at least one of a machine learning model or a physics-based model.

10. The method of claim 1, wherein the first parameter set includes at least one of a laser power, a laser speed, a laser beam diameter, or a hatch-spacing.

11. A system comprising:
a parameter development module;
a parameter development processor; and
a memory storing program instructions, the parameter development processor and the parameter development module operative with the program instructions to perform functions including:
receive, via a communication interface of the parameter development module, a first defined geometry for a first part and a second defined geometry for a second part, wherein the first and second parts are manufactured in a stack with an additive manufacturing machine;
generate a first parameter set to fabricate the stack of first and second parts with the additive manufacturing machine based on a first parameter set, the first parameter set determined using the first and second defined geometries and an operating range of the additive manufacturing machine;
collect first in-situ monitoring data from one or more in-situ monitoring systems of the additive manufacturing machine for the first and second parts;
calibrate at least one predictive material model using the collected in-situ monitoring data;
determine whether the stack should receive an additional part based on an output of the at least one predictive material model using second collected in-situ monitoring data; and
generate, when the determination is for the stack to receive the additional part, a second parameter set to fabricate the stack with the additional part.

12. The system of claim 11, wherein the collected in-situ monitoring data includes at least one of laser-material, laser-environment interactions, or a melt-pool response.

13. The system of claim 11, wherein it is determined whether the stack should receive the additional part when the collected in-situ monitoring data falls one of inside or outside of a predetermined value or range of values.

14. The system of claim 11, wherein the first parameter set is based on the at least one predictive material model.

15. The system of claim 14, wherein fabrication of the predictive material model further comprises program instructions to perform the functions as follows:
execute at least one of a bead-on-powder and bead-on-plate process with an initial parameter set to output one or more melt-pool tracks;
collect in-situ monitoring data from the one or more melt-pool tracks;
execute an in-situ analysis of the one or more melt-pool tracks with one or more in-situ monitoring systems of the additive manufacturing machine based on the collected in-situ monitoring data; and
generate at least one predictive material model based on at least one of the in-situ monitoring analysis and one or more tests or measurements performed on the one or more melt-pool tracks.

16. A non-transitory computer-readable medium storing instructions that, when executed by a computer processor, cause the computer processor to perform a method comprising:
- receiving a first defined geometry for a first part and a second defined geometry for a second part, wherein the first and second parts are manufactured in a stack with an additive manufacturing machine;
- generating a first parameter set to fabricate the stack of first and second parts with the additive manufacturing machine based on a first parameter set, the first parameter set determined using the first and second defined geometries and an operating range of the additive manufacturing machine;
- collecting first in-situ monitoring data from one or more in-situ monitoring systems of the additive manufacturing machine for the first and second parts;
- calibrating at least one predictive material model using the collected in-situ monitoring data;
- determining whether the stack should receive an additional part based on an output of the at least one predictive material model using second collected in-situ monitoring data; and
- generating, when the determination is for the stack to receive the additional part, a second parameter set to fabricate the stack with the additional part.

17. The medium of claim 16, wherein it is determined whether the stack should receive the additional part when the collected in-situ monitoring data falls one of inside or outside of a predetermined value or range of values.

18. The method of claim 1, wherein generating the second parameter set occurs during fabrication of the stack.

19. The method of claim 1, wherein the stack is a first stack fabricated on a first build plate, and further including fabricating a second stack including a plurality of parts on a second build plate according to at least one of the first parameter set or the second parameter set.

* * * * *